July 6, 1926.
J. J. HEINRICH
QUICKLY DETACHABLE HOSE COUPLING
Filed Jan. 15, 1925
1,591,871
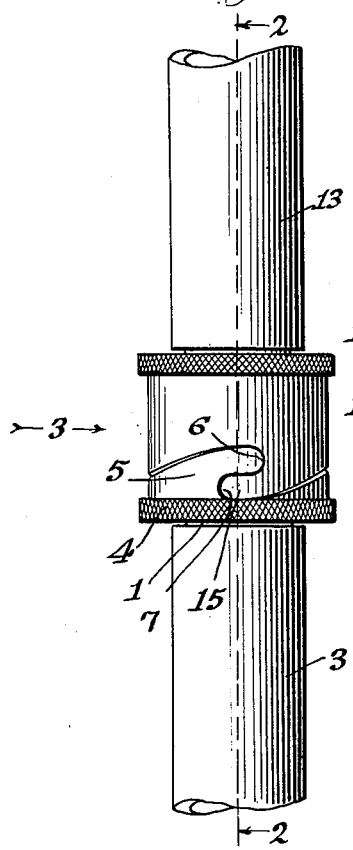
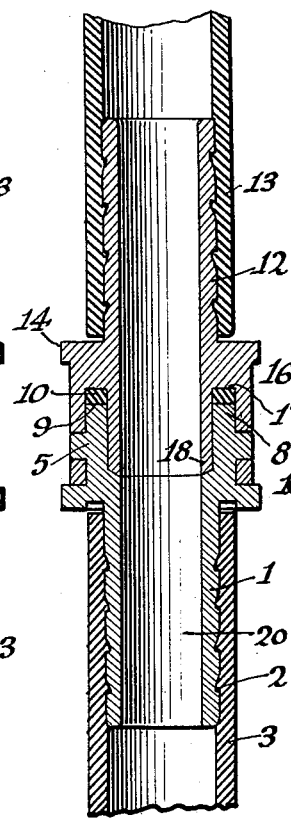
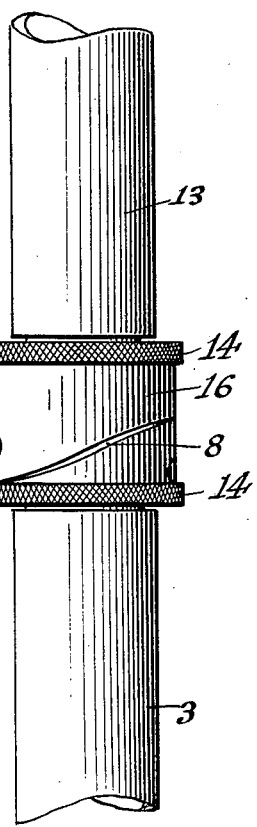
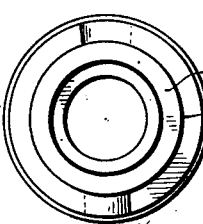
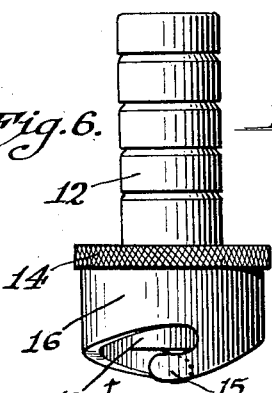
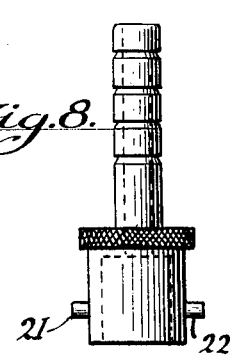
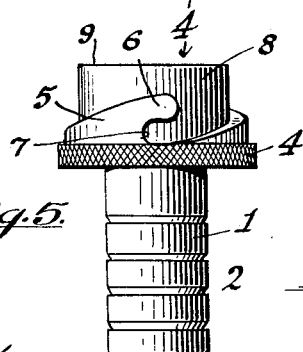
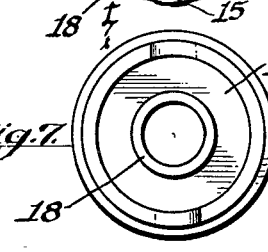

Patented July 6, 1926.

1,591,871

UNITED STATES PATENT OFFICE.

JACOB J. HEINRICH, OF LOS ANGELES, CALIFORNIA.

QUICKLY-DETACHABLE HOSE COUPLING.

Application filed January 15, 1925. Serial No. 2,522.

This invention relates to hose couplings, and particularly to that class described as quickly detachable hose couplings.

The object of this invention is to provide a coupling for hoses carrying water, oil, air or other substance under pressure, and to effect therefore a hermetic seal, combining with this accomplishment positive action and rapidity of operation.

In the accompanying drawings Figure 1 is a view of the coupling engaged.

Figure 2 is a sectional view of the same on the line 2—2 of Figure 1.

Figure 3 is a view in side elevation showing the coupling turned a quarter turn from the position indicated in Figure 1.

Figure 4 is a top plan view of one of the coupling members taken in the direction of the arrow 4 upon Figure 5.

Figure 5 is a view in side elevation showing one member of the coupling termed "the male member."

Figure 6 is a view in side elevation of the other, or "female" member of the coupling.

Figure 7 is a top plan view of the female member taken in the direction of the arrow 6 upon Figure 5.

Figures 8 and 9 illustrate a modified form of the hose coupling.

More specifically 1 is a cylindrical body formed with annular grooves 2 and adapted to receive the hose 3, which is clamped thereon by suitable clamping arrangement.

Formed integrally with the hollow cylindrical body is an enlarged annular shoulder 4 which is knurled to facilitate gripping it.

Upon the opposite side of the shoulder 4 from the body 1 there is formed a cylindrical portion 8, upon the opposite sides of which are formed upwardly inclined shoulders 5 terminating in tongues or clasps 6 which extend over recesses 7. The tongues 7 are adapted to engage with tongues upon the female member hereinafter described. The cylindrical portion 8 is adapted to telescope with the female member as shown in Figure 2 and has a flat upper edge 9, upon which is adapted to rest a washer 10 when the male and female members are in assembled relation.

A female member illustrated in Figure 6 comprises a cylindrical body 12 similar to the cylindrical body 1, to which is clamped hose 13, a knurled nut 14, and peripheral diagonally disposed tongues or clasps 15, these latter being adapted to occupy the recesses 7 and engage with tongues 6. The tongues 15 extend from an elongated shoulder 16. Annular groove 17 is formed between the shoulder 16 and a continuation 18 of the cylindrical body 12, which groove is adapted to receive the washer 10 seated on the rim 9, and also the cylindrical portion 8 of the male member.

In the use of this invention the opposing coupling members carrying the hose to be joined are drawn together with the tongues somewhat separated, and are twisted with a telescopic pressure until the tongues have been properly clasped and occupy the shoulder recesses, the resiliency of the washer 10 offering sufficient resistance to actively retain the opposing members in locked engagement.

It will be noted that when this coupling has been accomplished the body continuation 18 will fit tightly within the shoulder 5 and the cylindrical portion 8, and the hollow shoulder 16 will be in frictional proximity with the outside of the shoulder 8, thus effecting a positive coupling and effective seal, permitting a flow of liquid through the channel 20.

In the modified form of my invention as illustrated in Figs. 8 and 9. The illustration shows a male member which may take the place of that shown in Fig. 5 and be connected to the socket member such as shown in Fig. 6. In this case the pins 21 and 22 engage behind the tongues 15 similar to a bayonet type connection with the cylindrical body to which the pins are secured extending into the annular space between the elongated shoulder 16 and the continuation 18 of the cylindrical body 12, a packing washer similar to 10 being used to seal the joint.

It will be understood that various changes may be made in the details of the construction without departing from the spirit or scope of the invention as defined in the appending claim.

I claim:

A hose coupling comprising a male coupling member with a cylindrical body 1 adapted to receive a hose, a cylindrical portion 8 at the other end of the coupling having a flat upper end 9, an annular recess forming a socket on the inside of the cylindrical portion having an abutment at its inner end, oppositely inclined shoulders 5 integral with the cylindrical portion and on the outside thereof, tongues 6 terminating at the shoulders and forming recesses 7 thereunder in combination with a female member having a cylindrical portion 12 adapted to receive a hose, a continuation 18 at the other end of the cylindrical body adapted to fit in the socket formed by the annular recess, on the inside of the cylindrical portion 8 of the male member, integral elongated shoulders 16 forming an annular groove 17 between said shoulders 16 and continuation 18, tongues 15 on the ends of the shoulders 16 forming recesses thereunder, the tongues on the male and female members fitting in the respective recesses under the tongues and a washer 10 bearing on the flat end 9 and the annular wall of the groove 17.

In testimony whereof I have signed my name to this specification.

J. J. HEINRICH.